United States Patent [19]

Yoshinaga

[11] 4,209,977

[45] Jul. 1, 1980

[54] LIGHTER WITH A WATCH

[75] Inventor: Sadao Yoshinaga, Tokyo, Japan

[73] Assignee: Prince Industrial Development Co., Ltd., Tokyo, Japan

[21] Appl. No.: 31,339

[22] Filed: Apr. 19, 1979

[30] Foreign Application Priority Data

Apr. 20, 1978 [JP] Japan .................................. 53-52650
Apr. 20, 1978 [JP] Japan .................................. 52651

[51] Int. Cl.[2] ...................... G04B 27/00; G04B 37/12; A23L 1/22

[52] U.S. Cl. ...................................... 368/10; 431/253; 368/184

[58] Field of Search .......................... 58/23 R, 53–56, 58/85.5, 88 R, 88 B, 88 C, 88 E, 88 G, 89, 152; 431/25, 125, 132, 135

[56] References Cited

U.S. PATENT DOCUMENTS

| | | | |
|---|---|---|---|
| 2,577,679 | 12/1951 | Fraser | 431/253 X |
| 4,094,140 | 6/1978 | Ohue | 58/152 |
| 4,102,631 | 7/1978 | Gold | 431/253 |

*Primary Examiner*—Edith S. Jackmon
*Attorney, Agent, or Firm*—Weingarten, Maxham & Schurgin

[57] ABSTRACT

A lighter with a watch having a watch module interiorly disposed. A lighter case incorporates therein a fuel tank and a watch module and a display of the watch module is visible through a window formed in the side of the lighter case. The lighter is provided with a set button and a select button so as to easily correct reading, the date and hour, and seconds. Further, an ignition operator is utilized to make reading set, thus preventing erroneous operation of selection of the watch module and reading set.

4 Claims, 8 Drawing Figures

LIGHTER WITH A WATCH

BACKGROUND AND SUMMARY OF THE INVENTION

This invention relates to a lighter with a watch having a watch module interiorly disposed.

The invention provides an arrangement in which a lighter case has a fuel tank as well as a watch module interiorly disposed, and a display of the watch module is made visible through a window formed in the side of the lighter case so that the lighter may be utilized as a watch. Further, the invention provides a lighter with a watch of a novel construction provided at its bottom with a set button and a select button so that correction of reading, the date and hour, and the number of seconds may be achieved in an extremely simple operation.

In addition, the present invention provides a lighter with a watch wherein reading setting may be achieved by making use of an ignition operator, which is one of members constituting the lighter, to thereby prevent erroneous operation of selection of the watch module and reading set and wherein in reading, the condition of buttons need not be assured fully and reading set may be achieved very easily even in a dark place.

BRIEF DESCRIPTION OF THE DRAWINGS

The present invention will now be described by way of example with reference to the accompanying drawings, in which.

DESCRIPTION OF THE PREFERRED EMBODIMENTS

Figure 1:
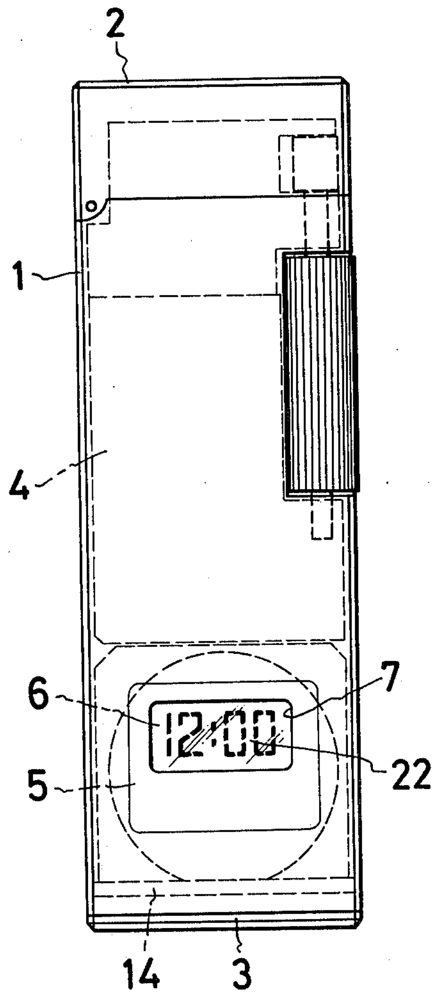
FIG. 1 is a front view of a lighter with a lid located at the top of a body adapted to be opened for ignition, a watch being accomodated within a lower space of the body.
Figure 2:
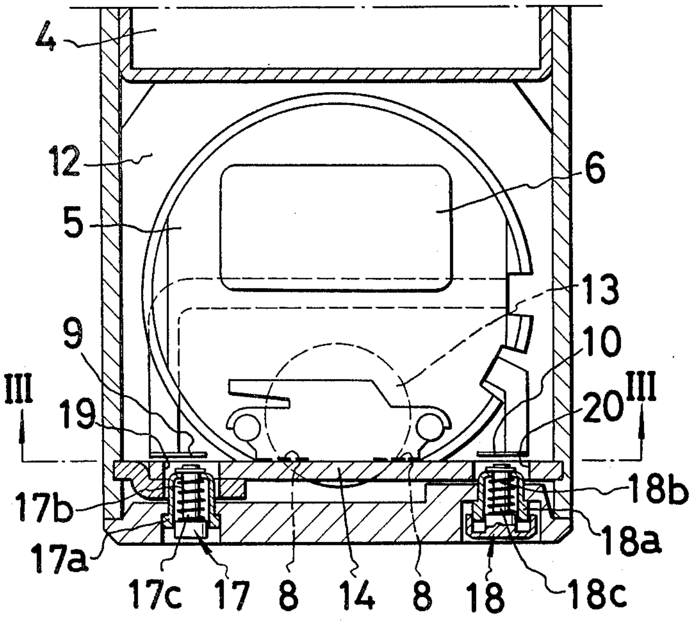
FIG. 2 is a sectional view showing the interior of the lower portion of the body in the lighter with a watch.
Figure 3:
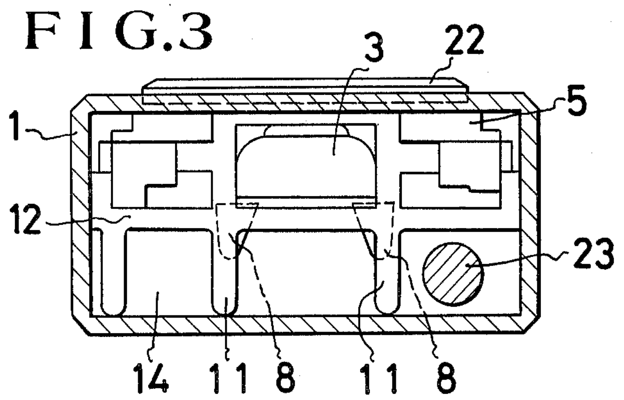
FIG. 3 is a sectional view taken along line III—III of FIG. 2.
Figure 4:
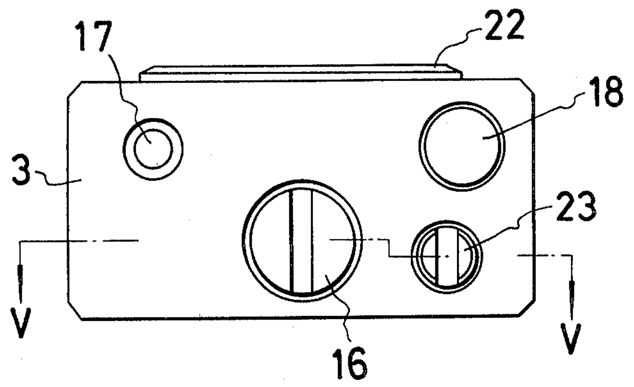
FIG. 4 is a bottom view of the body.
Figure 5:
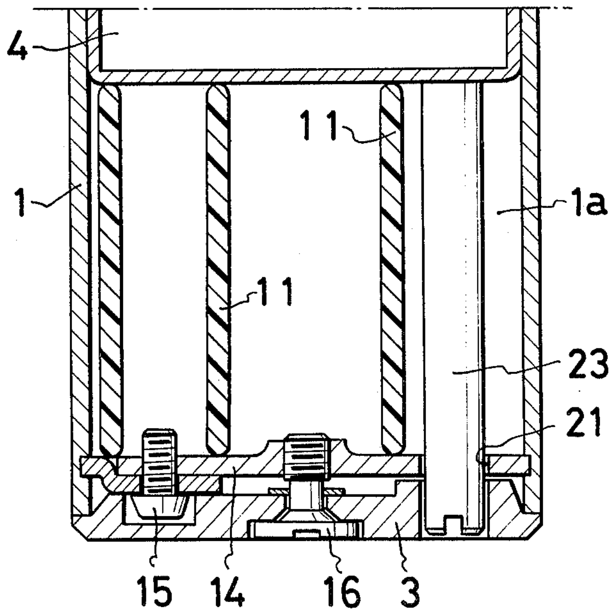
FIG. 5 is a sectional view taken along line V—V of FIG. 4.

Referring now to FIG. 1, there is shown a lighter case at 1 formed of electrically conductive metal whose side is of a rectangular configuration, the lighter case having a lid 2 disposed free to open and close at an upper end thereof and a bottom lid 3 disposed detachably at a lower end thereof. The lighter case is further interiorly equipped with a fuel tank 4 provided with an ignition device and a watch module 5 in upper and lower positional relationship, and has a window 7 positioned at the side of the case at which a display portion 6 of the watch module 5 is located.

The watch module 5, which is of a disc-like configuration, has the above-mentioned display portion 6 at the upper portion in front and earth plates 8 at the lower side thereof, and has a select terminal 9 and a set terminal 10 disposed at lower portions on opposite sides thereof. At the rear surface, there is arranged a plastic holder 12 from which a plurality of supports 11, 11 protrude to receive a battery 13 so as to be inserted into a space 1*a* underneath the fuel tank 4.

The holder 12 is secured by an electrically conductive stop plate 14 fitted in a groove at a lower portion internally of the lighter case 1 and the bottom surface of the fuel tank 4, the earth plates 8 being brought into pressure contact with the stop plate 14.

The stop plate 14 comprises two long and short plate members which are connected by a machine screw 15, and in a central portion thereof, there is formed with a screw hole for a set screw 16 which extends through the bottom plate 3, and in corner portions thereof, there are bored through-holes 19, 20, and 21 respectively for the machine screw 15, a select button 17 which extends through a flow adjuster 23 and the bottom lid 3, and a reading set button 18.

The select button 17 and reading set button 18 comprise push buttons 17*c* and 18*c* which are inserted to be locked within receiving cylinders 17*a* and 18*a* threaded in the bottom lid 3 by the action of coil springs 17*b* and 18*b* so that they face to the select terminal 9 and set terminal 10, respectively. With this arrangement, correction may be achieved by contact between the push button 17*c* and select terminal 9, and reading of the date, time and seconds may be effected by contact between the push button 18*c* and set terminal 10.

In the drawings, reference numeral 22 designates a window glass.

As described above, in the present invention, the lighter case 1 with the bottom lid 3 detachably mounted at the lower end thereof is interiorly equipped with the fuel tank 4 and the watch module 5 in upper and lower positional relationship so that the display portion 6 of the watch module 5 is made visible through the window 7 on the side of the case. Accordingly, an external appearance of the lighter will not be impaired and even in use, special operation will not be required. Also, the watch module 5 together with the battery 13 are fitted into the plastic holder 12 so as to be inserted into the lighter case and are secured by the fuel tank 4 and the stop plate 14 fitted in the lower side internally of the case. The earth plates 8 are brought into pressure contact with the stop plate 14 to provide an electric connection therebetween, thus preventing an occurrence of inferior contact resulting from vibrations. Moreover, the select button 17 and reading set button 18 are mounted on the bottom lid 3 so as to face to the select terminal 9 and set terminal 10 disposed on the opposite sides of the watch module 5, as a consequence of which the bottom lid 3 merely need be put in position to dispose the buttons and the respective buttons merely need be depressed to readily carry out reading and correction of the date, time and seconds.

Figure 6:
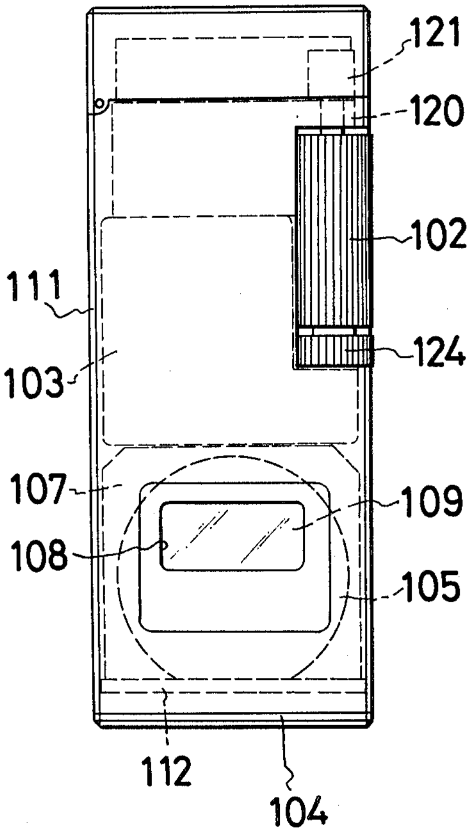
FIG. 6 is a front view of a lighter with a watch in accordance with a second embodiment.
Figure 7:
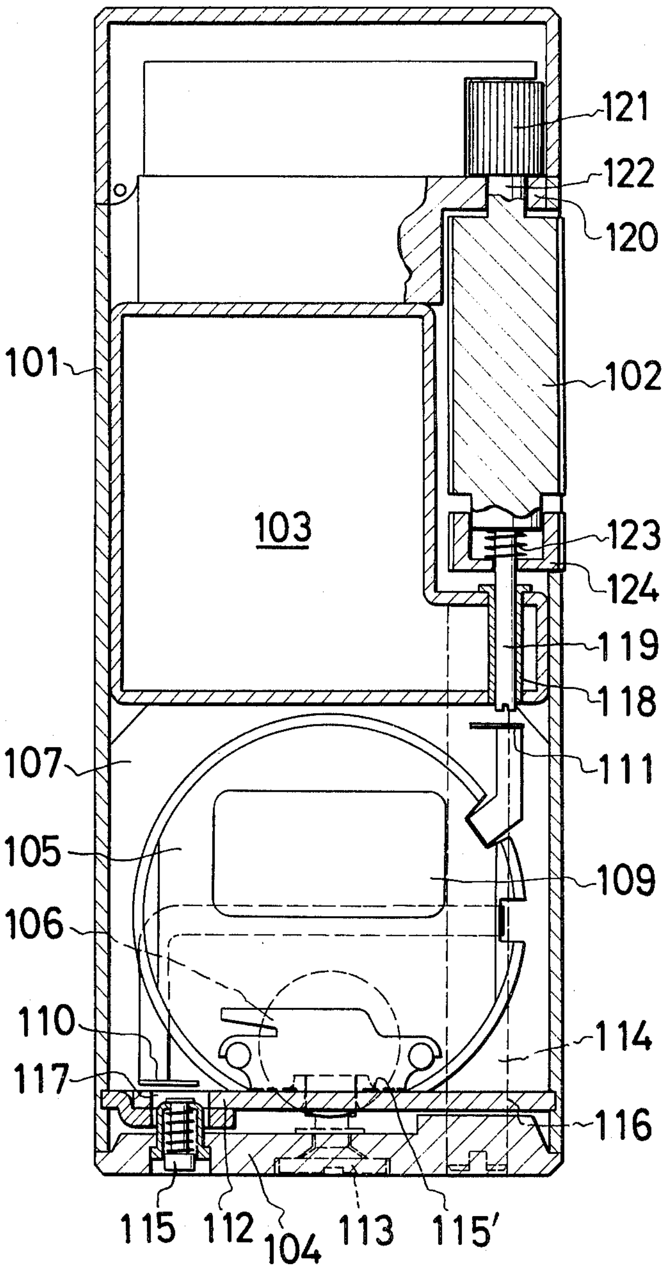
FIG. 7 is a longitudinal front view of the entire lighter with a watch.
Figure 8:
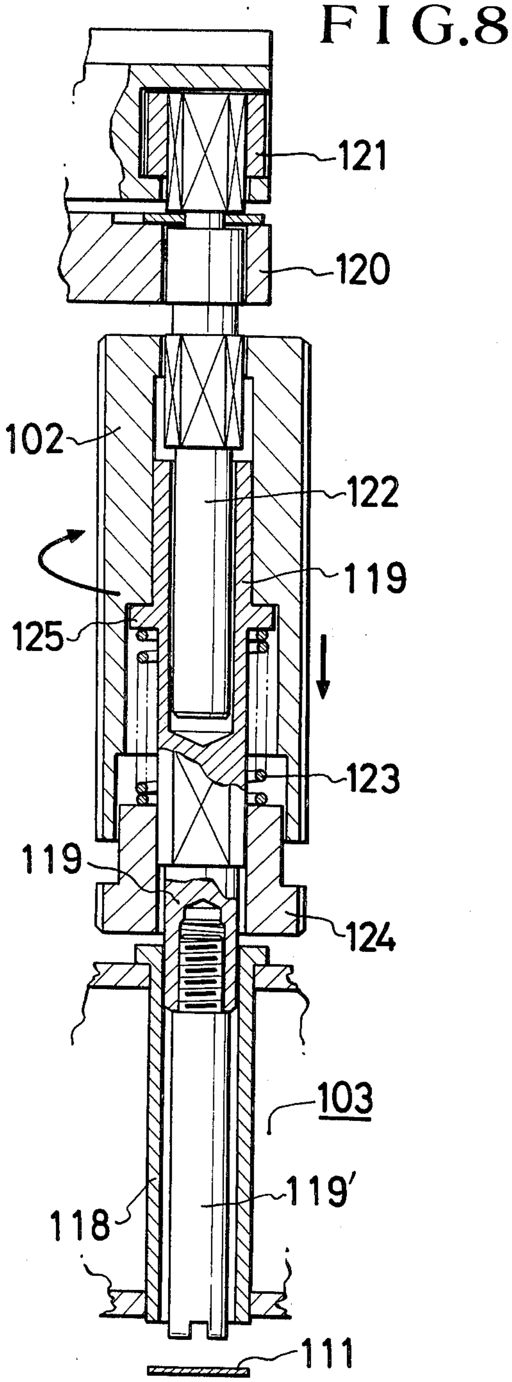
FIG. 8 is a longitudinal front view of a reading set device in accordance with a further embodiment.

In the embodiments shown in FIGS. 6 through 8, the above-mentioned reading terminal is positioned underneath an ignition operator which forms one of members constituting a lighter so that the ignition operation may be moved up and down to effect reading set.

Reference numeral 101 designates a lighter case formed of electrically conductive metal whose side is of a rectangular configuration, and has at a corner portion thereof an ignition operator 102 supported rotatably and movably up and down.

A fuel tank 103 provided at its upper portion with an ignition device block is inserted into and secured to the case, a watch module 105 together with a battery 106 are fitted in a plastic holder 107 in a space between the fuel tank 103 and a bottom lid 104 mounted at an opening at the lower end, and a display portion 109 is positioned in a window 108 bored in the side of the lighter. Of a pair of terminals disposed on opposite sides of the watch module 105, a select terminal 110 is positioned downwardly, and a set terminal 111 is positioned upwardly directly below the ignition operator 102, these terminals being secured in their position by locking the holder 107 by a stop plate 112 mounted internally of the bottom lid 104. An earth plate 115' of the watch module 105 is electrically connected with the stop plate 112. The stop plate 112 is further provided with a threaded hole in a set screw 113 of the bottom lid 104 and holes 116 and 117 through which a select button 115 passing through a flow adjuster 114 and bottom lid 104 extends, and the end of the select button 115 is movable towards and away from the select terminal 110, through the hole 117.

The ignition operator 102, which is of a cylindrical configuration, is held rotatably and movably up and down by a lower shaft 119 inserted into a bearing pipe 118 extending through the fuel tank 103 and an upper shaft 122 extending through an ignition ring supporting portion 120 of the ignition device and connected to an ignition ring 121 and is normally biased upwardly by an internally disposed spring 123.

In an embodiment shown in FIG. 7, the ignition operator 102 has the lower shaft 119 and upper shaft 122 extended integrally at the upper and lower ends, respectively, thereof, the spring 123 is retained between the stepped portion of the lower shaft 119 and a receiving member 123 to resiliently support the ignition operator 102 upwardly, and the lower shaft 119 is extended downwardly to serve as a reading set member movable towards and away from the set terminal 111 so that when the ignition operator 102 is pressed down against the spring 123, it may come into contact with the set terminal 111 to effect reading set.

Further, in an embodiment shown in FIG. 8, the lower shaft 119 and upper shaft 122 are fitted with each other movably in an axial direction to form a single longitudinal shaft about which rotation is effected, the spring 123 is retained between a flange 125 formed in the lower shaft 119 and a receiving member 124 to hold the lower shaft 119 movably up and down, and the lower shaft 119 extends through the bearing pipe 118 to form an extension member 119' whose lower end is positioned above the set terminal 111 so as to serve as a reading set member. The ignition operator 102 fitted into the aforesaid longitudinal shaft engages the upper shaft 122 and is supported on the flange 125 to be rotated along with the upper shaft 122. When the ignition operator 102 is pressed down againt the spring 123, the lower end of the extension member 119 comes into contact with the set terminal 111.

As described above, in the present invention, the longitudinal shaft of the ignition operator is extended downwardly so that it may be utilized as the reading set member of the watch module accommodated within the lighter case, and therefore, only the provision of a reset button on the side or bottom surface of the lighter will suffice whereby the device can be simplified by that portion. In addition, since the reading set may be achieved by axial movement of the ignition operator prearranged movably up and down, such reading set may be facilitated as compared to the case where reading set is achieved by operation of a button embedded in the lighter, and in reading set, erroneous operation of the reset button will not occur.

What is claimed is:

1. A lighter with a watch in which a watch module is fitted to be inserted into a plastic holder together with a battery, underneath a fuel tank within a lighter case, a display portion of the watch module faces to a window formed in the side of the lighter, a stop plate provided with a plurality of through-holes and a threaded hole is fitted in a lower portion internally of the lighter case so that earth plates are placed under pressure thereon, a select terminal and a set terminal of the watch module are respectively positioned in said through-holes, and a bottom lid is mounted on said stop plate so that a select button and a reading set button extending through the bottom lid are positioned movably towards and away from the respective terminals.

2. A lighter with a watch as set forth in claim 1 wherein said holder is integrally provided at its back with a plurality of supports in contact with internal walls of said lighter case.

3. A lighter with a watch in which a fuel tank and a watch module are accommodated within a lighter case in upper and lower relationship, and a display portion of the watch module faces to a window formed in the side of the lighter, the improvement wherein a set terminal of said watch module is positioned downwardly of a rotatable cylindrical ignition operator mounted on a corner portion of the lighter case, said ignition operator being supported movably up and down while a spring is internally retained, and a lower end of a longitudinal shaft about which the ignition operator rotates extends onto said set terminal so as to serve as a reading set member also.

4. A lighter with a watch as set forth in claim 3 wherein said longitudinal shaft about which rotation is effected comprises a combination of a lower shaft having a flange and a rotatable upper shaft extending through an ignition ring supporting portion and connected to the ignition ring, said lower and upper shafts being fitted with each other so that the lower shaft may be moved in an axial direction, said ignition operator is inserted so that it may be rotated together with the upper shaft with respect to the longitudinal shaft and may be moved together with the lower shaft in an axial direction, the lower shaft is normally biased upwardly together with the ignition operator by means of a coil spring disposed between said flange and a receiving member fitted in the periphery of the lower shaft, and a member associated with the lower shaft is isolated from the reset terminal.

* * * * *